United States Patent Office 3,232,958
Patented Feb. 1, 1966

3,232,958
METALLOID AZIDES AND PROCESS FOR PREPARING THE SAME
Robert M. Washburn, Whittier, Calif., assignor to American Potash & Chemical Corporation, Los Angeles, Calif., a corporation of Delaware
No Drawing. Filed Nov. 3, 1961, Ser. No. 149,885
10 Claims. (Cl. 260—349)

The present invention relates to novel metalloid azides and to processes for preparing the same.

Broadly, the metalloid azides of this invention may be represented by the following formula:

$$R_{4-n}M(N_3)_n$$

wherein R is selected from the group consisting of aryl, alkyl, halogen, alkoxy, aryloxy, amino, alkylthio, and arylthio groups; M is a metal selected from the group consisting of silicon, germanium, and tin; and $n$ is a whole number from 1 to 3.

These novel compounds can be prepared by reacting one mole of
(a) a compound having the formula $$R_{4-n}MX_n$$

wherein R is selected from the group consisting of aryl, alkyl, alkoxy, aryloxy, amino, alkylthio, and arylthio groups; M is a metal selected from the group consisting of silicon, germanium, and tin; X is a halogen atom; and $n$ is a whole number from 1 to 3; with
(b) from one to three moles of a compound having the formula $$M'N_3$$

wherein M' is a metal selected from the group consisting of alkali metals and alkaline earth metals.

In carrying out the novel reaction of the present invention, it has been found that for each one mole of compound (a) there must be used from one to three moles of compound (b). The reaction must be carried out under anhydrous conditions to prevent the hydrolysis of the starting metalloid halides and the resulting metalloid azide products. This can be achieved conveniently by carrying out the reaction in an inert atmosphere or under vacuum.

In the formulae above it is indicated that R is selected from a number of listed chemical groups. Examples of suitable radicals falling within these chemical groups include:

Aryl: —$C_6H_5$—; o, m, and p—Cl—$C_6H_4$—; o, m, and p-$CH_3$—$C_6H_4$—; o, m, and p-$(CH_3)_2N$—$C_6H_4$—; o, m, and p-$C_6H_5$—$C_6H_4$—; o, m, and p-$CH_3O$—$C_6H_4$—; o, m, and p-F—$C_6H_4$—; o, m, and p-Cl—$C_6H_4$—; o, m, and p-Br—$C_6H_4$—; o, m and p-I—$C_6H_4$—; o, m, and p-$NO_2$—$C_6H_4$—; o, m, and p-$C_6H_5O$—$C_6H_4$—; $\alpha$-$C_{10}H_7$—; $\beta$-$C_{10}H_7$—; and the like;

Alkyl: —$CH_3$—; $C_2H_5$—; i-$C_3H_7$—; n-$C_4H_9$—;

i-$C_4H_9$— sec.-$C_4H_9$—; $CH_3OCH_2CH_2$—; $CH_3OCH_2CH_2CH_2$—; $ClCH_2CH_2CH_2$—; $C_6H_5CH_2$—; $C_6H_5CH_2CH_2$—; and the like.

Halogen: F, Cl, Br, I;

Alkoxy: $CH_3O$—; $C_2H_5O$—; $C_3H_7O$—; $C_4H_9O$—;

$CH_3OCH_2CH_2O$— and the like;

Aryloxy: $C_6H_5O$—; o, m, and p-$CH_3$—$C_6H_4O$—; o, m, and p-F—$C_6H_4O$—; o, m, and p-Cl—$C_6H_4O$—; o, m, and p-Br—$C_6H_4O$—; o, m, and p-$C_6H_4$—$C_6H_4O$—; o, m, and p-I—$C_6H_4O$—; o, m, and p-$(CH_3)_2N$—$C_6H_4O$—; o, m, and p-$CH_3O$—$C_6H_4O$—; o, m, and p-$C_6H_5O$—$C_6H_4O$—; o, m, and p-$NO_2$—$C_6H_4O$—; and the like;

Amino: $(CH_3)_2N$—; $(C_2H_5)_2N$—; $C_6H_5NCH_3$—; and the like;

Alkylthio: $CH_3S$—; $C_2H_5S$—; $C_3H_7S$—;

$C_2H_5SCH_2CH_2S$— and the like;

Arylthio: $C_6H_5S$—; o, m, and p-$CH_3$—$C_6H_4S$—; and the like.

The synthesis of the metalloid azides of this invention can be carried out in a variety of solvents including, for example, di-n-butyl ether, pyridine, triethylamine, toluene, acetonitrile, and the like, and at reaction temperatures from about room temperature to about 150° C. for periods of several hours to several days.

Compound (a) above, is a metal halide in which the metal is either silicon, germanium, or tin. Examples of silicon halides which are suitable for use in this invention include phenyltrichlorosilane, diphenyldibromosilane, triphenylfluorosilane, phenyldimethylbromosilane, diphenylethylfluorosilane, tri-n-propylchlorosilane, phenylidiphenoxychlorosilane, diphenyldimethylaminochlorosilane, tri-p-tolylchlorosilane, $\alpha$-naphthylphenylmethylbromosilane, di(o-chlorophenyl)phenylthiobromosilane, tri(m-phenoxyphenyl) chlorosilane, and the like.

Examples of germanium halides which are suitable for use in this invention include phenyldimethylchlorogermane, diphenyldichlorogermane, phenyltribromogermane, tri-n-butylfluorogermane, di(p-tolyl)dibromogermane, $\alpha$-naphthyltrichlorogermane, phenyldiphenoxychlorogermane, di(o-chlorophenyl)methylthiobromogermane, m-tolylmethyldimethylaminobromogermane, and the like.

Examples of tin halides which may be used in this invention include triphenylchlorostanne, diphenyldibromostanne, trimethylfluorostanne, m-tolyltrichlorostanne, tri(o-chlorophenyl)fluorostanne, di($\alpha$-naphthyl)dibromostanne, tris(dimethylamino)chlorostanne, phenyldiphenylthiochlorostanne, and the like.

In order to illustrate this invention even more fully the following specific examples are set forth.

Example I

One mole of triphenylchlorosilane and one mole of sodium azide are refluxed in pyridine for 24 hrs. to yield triphenylazidosilane after removing the sodium chloride by filtration and distilling the solvent.

Example II

When two moles of lithium azide are reacted with one mole of dimethyldichlorosilane in toluene at room temperature for 3 days, a toluene solution of dimethyldiazidosilane is obtained.

Example III

The interaction of phenyltrichlorogermane (one mole) and potassium azide (3 moles) in refluxing acetonitrile for 24 hrs. yields phenyltriazidogermane.

Example IV

Triethylchlorostanne (1 mole) reacts in toluene with sodium azide (1 mole) to yield triethylazidostanne.

Example V

The interaction of phenyldimethylbromosilane (one mole) and sodium azide (one mole) in refluxing pyridine for 36 hrs. yields phenyldimethylazidostanne.

In addition to the above described metalloid azides, a class of difunction metalloid azides having the generalized formula shown below also can be synthesized.

$$(N_3)_nR_{3-n}M—L—MR_{3-n}(N_3)_n$$

In the formula, R and M are as defined above, L is an arylene or alkylene group, and $n$ is a whole number of from 1 to 3.

Examples of suitable arylene and alkylene groupings represented by L in the formula are 1,4-$C_6H_4$—; 1,3-$C_6H_4$—; 4,4'-$C_6H_4$—O—$C_6H_4$—; 1,4-naphthylene; pentamethylene; and the like.

These difunctional metalloid azides can be prepared by reacting one mole of (i) a difunctional metalloid halide, having the generalized formula shown below, $$X_nR_{3-n}M—L—MR_{3-n}X_n$$

where R, M, and L are as defined for the above difunctional metalloid azide, $n$ is a whole number from 1 to 3, and X is halogen, with (ii) from 2 to 6 moles of a compound having the formula $$M'N_3$$

wherein M' is as defined above.

Examples of suitable difunctional metalloid halides are 1,4-$Cl_3Si$—$C_6H_4$—$SiCl_3$;

$$1,3-BrGe(CH_3)_2—C_6H_4—Ge(CH_3)_2Br$$

$$4,4'-F_2Sn(C_6H_5)—C_6H_4—O—C_6H_4Sn(C_6H_5)F;$$

$$1,5-ClSi(C_6H_5)_2(CH_2)_5Si(C_6H_5)_2Cl$$

and the like.

The following examples illustrate the preparation of difunctional metalloid azides.

Example VI

A mixture of one mole of 1,4-$Cl_3Si$—$C_6H_4$—$SiCl_3$ and 6 moles of lithium azide is refluxed in pyridine for 36 hrs. to yield 1,4-$(N_3)_3Si$—$C_6H_4$—$Si(N_3)_3$.

Example VII

After one week at room temperature, a mixture of two moles of sodium azide and one mole of $$1,3-BrGe(CH_3)_2—C_6H_4—Ge(CH_3)_2Br$$

results in the formation of $$1,3-N_3Ge(CH_3)_2—C_6H_4—Ge(CH_3)_2N_3$$

Example VIII

When one mole of $$4,4'-F_2Sn(C_6H_5)—C_6H_4—o-C_6H_4—Sn(C_6H_5)F_2$$

and four moles of sodium azide are reacted in xylene solvent at 100° for 48 hrs.

$$4,4'-(N_3)_2Sn(C_6H_5)C_6H_4—o-C_6H_4—Sn(C_6H_5)(N_3)_2$$

is recovered.

Example IX

The interaction of one mole of $$1,5-ClSi(C_6H_5)_2(CH_2)_5Si(C_6H_5)_2Cl$$

and two moles of potassium azide in the absence of a solvent at 100° C. for 24 hrs. yields $$1,5-N_3Si(C_6H_5)_2(CH_2)_5Si(C_6H_5)_2N_3$$

Example X

One mole of $$ClSn(CH_3)_2C_6H_4—C(CH_3)_2—C_6H_4Sn(CH_3)_2Cl$$

and two moles of lithium azide are refluxed in pyridine for 24 hrs. to yield $$N_3Sn(CH_3)_2C_6H_4—C(CH_3)_2—C_6H_4Sn(CH_3)_2N_3$$

The mono and difunction metalloid azides illustrated in Examples I–X have utility as insecticides, herbicides, fungicides, oil additives, blowing agents, and the like. They are also useful as chemical intermediates for the synthesis of metalloid phosphoranes, arsanes, and stibanes as described in co-pending application Serial No. 149,887, filed Nov. 3, 1961, now U.S. Patent 3,112,331, which is assigned to the same assignee as the present invention.

The azide compounds of this invention may be incorporated into resin compositions where they function as blowing agents during curing of the resins. The following example illustrates this use.

Example XI

Twenty grams of an epoxy resin (having a melting point of 8°–12° C., and epoxide equivalency of 190 to 210 and a viscosity of Z–5 to Z–6 on the Gardner-Holdt scale) are admixed with about 2.9 grams of tetraethylenepentamine as a catalyst therefor. Thereafter, 0.4 gram of trimethylphosphite and 0.4 gram of triphenylsilyl azide are added to the mixture. The resultant mixture is heated to about 100° C. whereupon the phosphite and azide react to liberate nitrogen which passes out of the mixture and foams the resin. After about 10 minutes a firm, thermoset foamed resin results having a density of about 0.2–0.3 grams per cc.

While the present invention has been described with respect to what at present are preferred embodiments thereof it will be understood, of course, that certain changes, substitutions, modifications and the like may be made therein without departing from the true scope of the invention as defined in the appended claims.

What is claimed is:
1. Triphenylazidosilane.
2. Dimethyldiazidosilane.
3. Phenyltriazidogermane.
4. Triethylazidostanne.
5. Phenyldimethylazidostanne.
6. 1,4-bis(triazidosilyl)benzene.
7. 1,3-bis(dimethylazidogermanyl)benzene.
8. 4,4'-bis(phenyldiazidostannyl)diphenylether.
9. 1,5-bis(diphenylazidosilyl)pentane.
10. p,p'-bis(dimethylazidostannyl)-2,2-diphenylpropane.

References Cited by the Examiner
UNITED STATES PATENTS

| | | | |
|---|---|---|---|
| 2,712,026 | 6/1955 | Schrader | 260—349 |
| 3,030,388 | 4/1962 | Moore et al. | 260—349 |
| 3,047,589 | 7/1962 | Scott | 260—349 |

OTHER REFERENCES

Moeller, "Inorganic Chemistry," pp. 661, 669, 670, 673 and 676 (Wiley) (1952).

Rochow et al., J.A.C.S., Vol. 75, pp. 3099–3101 (1953).

WALTER A. MODANCE, *Primary Examiner*

IRVING MARCUS, *Examiner*.